United States Patent

Bonzano et al.

[11] Patent Number: 6,011,246
[45] Date of Patent: Jan. 4, 2000

[54] INDUCTION-HEATING DEVICE FOR SURFACE TREATING THE TEETH OF A MECHANICAL PART

[75] Inventors: Giorgio Bonzano, Leini, Italy; Bernard Criqui, Suresnes, France; Maria Dias De Sousa, Paris, France; Olivier Longeot, Talence, France

[73] Assignees: Renault, Boulogne-Billancourt; Ensam Bordeaux, Talence, both of France; Saet, Leini, Italy

[21] Appl. No.: 09/142,170

[22] PCT Filed: Mar. 14, 1997

[86] PCT No.: PCT/FR97/00463

§ 371 Date: Dec. 11, 1998

§ 102(e) Date: Dec. 11, 1998

[87] PCT Pub. No.: WO97/36459

PCT Pub. Date: Oct. 2, 1997

[30] Foreign Application Priority Data

Mar. 22, 1996 [FR] France ................................. 96 03575

[51] Int. Cl.[7] .................. H05B 6/40; H05B 6/14
[52] U.S. Cl. .......................... 219/640; 219/673; 219/674; 148/573; 266/129
[58] Field of Search ..................... 219/640, 635, 219/672, 673, 674; 148/573, 572, 567, 569; 266/129

[56] References Cited

U.S. PATENT DOCUMENTS

| | | |
|---|---|---|
| 3,196,244 | 7/1965 | Wulf ........................................ 219/640 |
| 4,675,488 | 6/1987 | Mucha et al. ........................... 219/640 |
| 4,808,779 | 2/1989 | Cogley .................................... 219/640 |

FOREIGN PATENT DOCUMENTS

| | | | |
|---|---|---|---|
| 2 536 943 | 6/1984 | France . | |
| 892 354 | 10/1953 | Germany ............................... 219/640 |
| 966 784 | 10/1957 | Germany . | |
| 94 18808 | 8/1994 | WIPO . | |

OTHER PUBLICATIONS

Evans: "Induction–hardening of Gears", Engineers Digest, vol. 31, No. 12, Dec. 1970, London GB, pp. 57–68.

Primary Examiner—Philip H. Leung
Attorney, Agent, or Firm—Oblon, Spivak, McClelland, Maier & Neustadt, P.C.

[57] ABSTRACT

An induction heating device for surface treating the teeth (11) of a mechanical part on which each tooth (111) has a projecting tip (111s) and a tooth root linking the tooth to an adjacent tooth, wherein an in duction coil (12, 12') is spaced from the tooth tips and powered by at least one high-frequency current source. The coil consists of a set of conductive segments (24, 24') individually orthogonal to the generatrix (d, d') of the teeth, located above respective tooth tips and interconnected via connecting segments (25, 25').

12 Claims, 4 Drawing Sheets

INDUCTION-HEATING DEVICE FOR SURFACE TREATING THE TEETH OF A MECHANICAL PART

The invention relates to an induction-heating device for surface treatment of the gear of a mechanical part such as a pinion.

Attempts have already been made to subject the gear of a pinion to surface heating which exactly follows the gear profile, such that it coincides with the quenched layer.

For this purpose the part to be heated is placed in an induction coil through which an alternating current is passed.

At high frequency (>100 kHz), however, it has been observed that the induced currents best follow the tooth profile, but the thermal flux is convergent at the tip of the gear and divergent at the root thereof.

At medium current frequency (<30 kHz), the induced current density is low at the tooth tip and high at the tooth root.

In both cases, the hardened quench zone therefore cannot follow the gear profile, all the more so because the depth of the induced current also depends on the gear module.

A solution has been sought in two-stage heating comprising successive heating at low frequency and then at high frequency.

Nonetheless, difficulties are observed in regulating the heating power at low and high frequency using a single inductor.

More generally, the gear profile must be heated above a transformation temperature and must then be cooled rapidly by quenching with a liquid to achieve hardening. The factors which influence the resulting treatment thickness are depth to which the gear is heated, temperature up to which the heating temperature exceeds the transformation temperature, and cooling rate. A circular induction coil situated a short distance from the undulating gear surface generally produces greater induction heating in the regions of the gear tips than in the transition regions between the teeth. The heating temperature and depth are therefore greater in the outer regions of the teeth. The differently heated zones are therefore cooled at different rates by the quenching process.

The treatment depth thus obtained and applied to the gear of a pinion is no longer uniform. The hardening obtained is then excessive in the region of the tooth tips and insufficient in the region of the connecting surfaces between the teeth. For successful hardening of the teeth of a toothed wheel by induction heating, it is therefore necessary to heat the part uniformly to a previously chosen temperature, directly with quench-hardening to a controlled depth.

A process for hardening to a uniform depth on the surface of the teeth of the toothed wheel is described in U.S. Pat. No. 4,675,488. According to that process, a toothed wheel is disposed in an induction coil having an axial height or length corresponding to that of the toothed wheel in its axial direction. The induction coil is supplied briefly with alternating current at a frequency below 50 kHz, in order to preheat the toothed wheel. Since the heating depth obtained by induction heating is inversely proportional to the square root of the current frequency in the induction coil, preheating penetrates into the toothed wheel. The body of the tooth is therefore heated to a temperature lower than the temperature for transformation by quench-hardening of the metal comprising the toothed wheel. A second preheating stage at lower frequency continues heating of the body of the toothed wheel and the flanks of the gear.

According to this process, the toothed wheels are first introduced axially into a medium-frequency induction-heating coil.

The toothed wheel is then displaced axially into a second induction-heating coil, in which it is subjected to final heating by a greater current at high frequency.

Each coil must have an axial length longer than the axial length of the toothed wheel to permit overall heating thereof.

This process, which uses straight annular turns concentric with the pinion, permits uniform heating of the teeth of straight-gear pinions, since the induced currents then circulate parallel to the gear edges. When the gear to be treated is a helical gear with helix angle larger than 20°, however, circulation of the induced current in the tooth generates dissymmetric heating of the gear edges. This is due to the fact that the current is induced orthogonal to the active conductors of the induction coil and circulates parallel to the axis of rotation of the toothed wheel. When the generating lines of the gear are no longer parallel, the induced currents become distributed nonuniformly therein. In this case the quenching process causes swelling of the tooth flank and a risk of flaking during engagement of the gear.

The object of the invention is therefore an induction-heating device which remedies these drawbacks.

In addition, a switching device may be provided to turn on the first and second current sources in alternation, while the toothed surface can be displaced in alternating axial movement relative to the coil.

The induction surface of the coil may be directed radially inward or outward to treat the internal gear of an annular planet gear or the helical external gear of a pinion.

The invention is advantageously applicable to final induction heating prior to quench-hardening of the cylindrical toothed surface of a helical-gear pinion. The invention is also applicable to induction heating of elongated toothed parts such as steering racks.

The invention relates more particularly to an induction-heating device for surface treatment of the gear of a mechanical part on which each tooth has a projecting tip and a gear root for connection with an adjacent tooth, in which an induction coil is spaced from the toothed surface and is supplied by at least one high-frequency current source for preheating.

According to the invention, the induction coil comprises an assembly of conductor segments individually orthogonal to the generating line of the gear, respectively located above the gear tips and interconnected by connecting segments.

According to another characteristic of the coil, the conductor segments extend through an element for concentrating the magnetic field induced by the said conductor segments.

According to another characteristic of the coil, the element for concentrating the magnetic field extends above the median zone of the gear.

According to a particular embodiment of the induction-heating device according to the invention, the connecting segments extend above a first conductor segment and join together a second and a third conductor segment.

According to another particular embodiment of the induction-heating device according to the invention, the conductor segments extend beyond the side faces of the gear and are interconnected by connecting segments distanced from the gear.

According to an additional characteristic of the second particular embodiment, short-circuit rings are disposed laterally and on both sides of the gears.

Other characteristics and advantages of the invention will become apparent on reading a practical example thereof applied to the treatment of a helical gear of a pinion, with reference to the attached drawing, wherein:

FIG. 5a is a perspective diagram of the induction coil shown in FIG. 4a.

Figure 1:
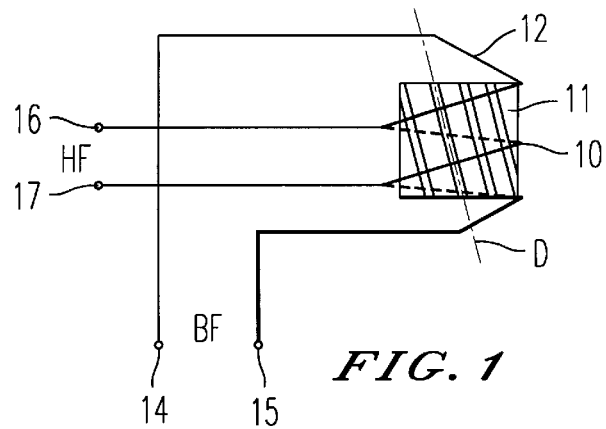
FIG. 1 is a schematic diagram of a device for heating at high and medium frequencies.

FIG. 1 represents a toothed pinion 10 whose helical gear 11 is defined by a generating line (d). An induction coil 12 has a number of turns 13 connected to a low-frequency source in order to produce a magnetic flux having the value necessary to achieve sufficient heating with a relatively low current.

Coil 12 has terminals 14, 15, between which there are included 2 turns and which are connected to the low-frequency source.

Coil 12 has taps 16, 17 connected to a high-frequency source. In the described example, the high-frequency winding has only one single turn.

The powers to be used will be those suitable for the material comprising the gear and will depend on the resistivity of the said material.

The lowest frequencies can be on the order of 3 kHz and the highest frequencies on the order of 400 kHz.

Figure 2:
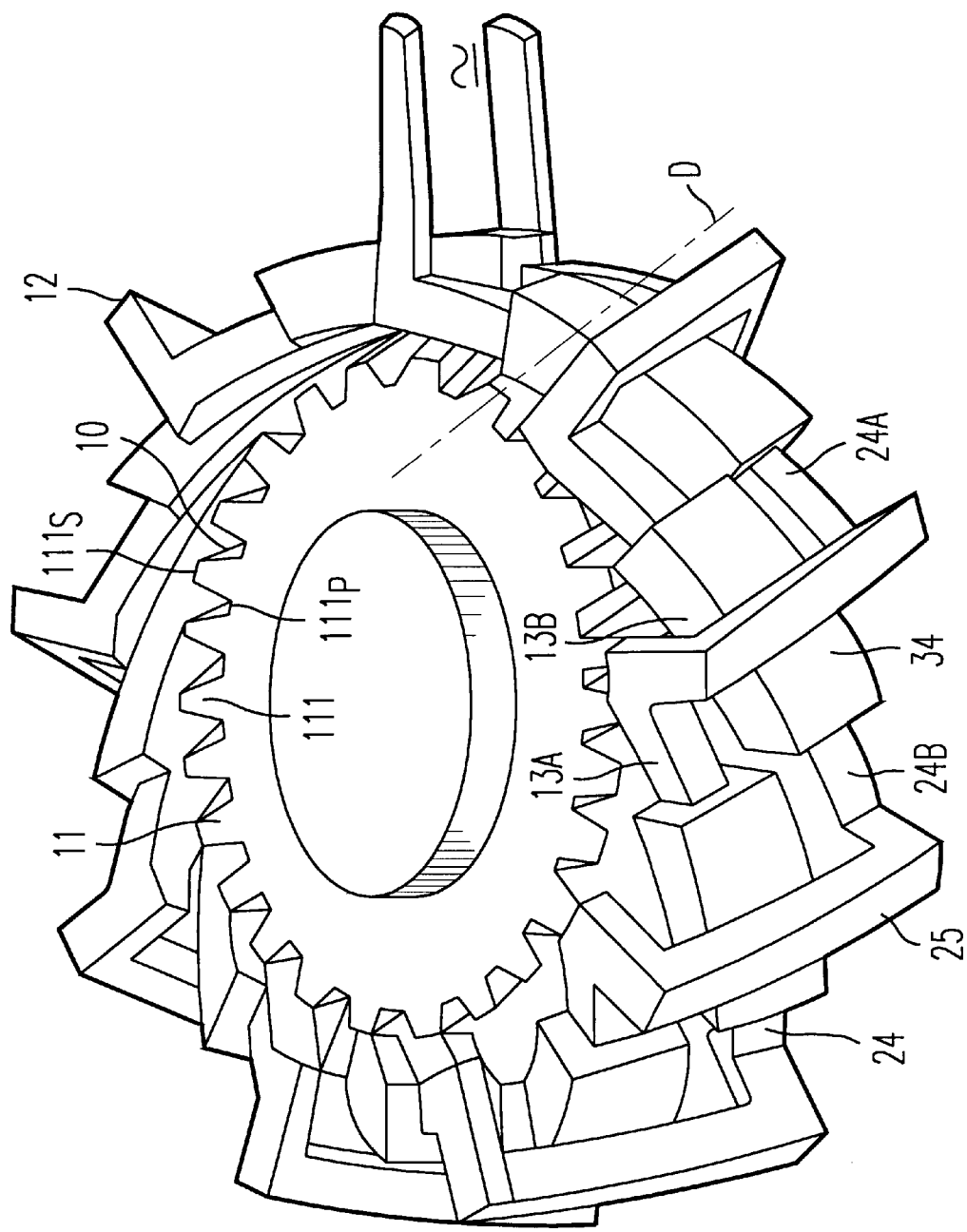
FIG. 2 is a perspective diagram of a helical-gear pinion and of a structural and positional detail of the induction coil of a first embodiment of the induction-heating device according to the invention.

As shown in FIG. 2, which corresponds to a first embodiment of the induction-heating device according to the invention, the pinion 10 and its helical gear 11 are disposed concentrically with respect to the coil 12 comprising two turns 13a, 13b. The gear 11 is comprised by elementary teeth 111, provided with a projecting tip 111s and a root 111p for connection to an adjacent tooth.

Coil 12 is radially spaced from and disposed at a distance close to the tooth tips 111s, and is comprised by an assembly of conductor segments 24 which are individually orthogonal to the oblique generating lines (d) of the respective teeth 111. In this way the segments 24 extend transversely above the tips 111s.

Figures 6, 7:
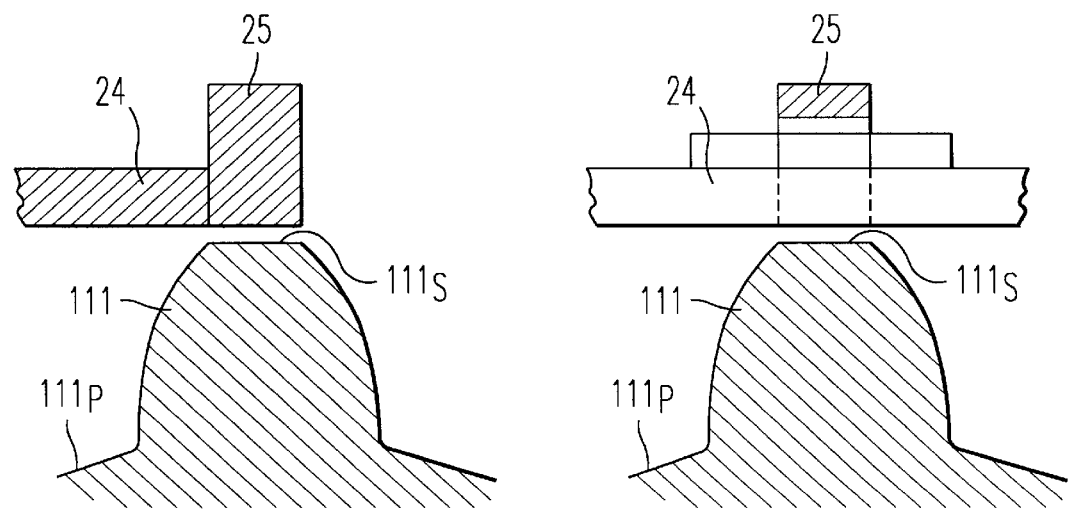
FIGS. 6 and 7 are characteristic sections VI and VII of the induction coil shown in FIG. 3.

As shown in FIGS. 2, 6 and 7, two conductor segments 24a, 24b are connected via their respective extremities to two separate connecting segments 25, one of the two connecting segments 25 connected to the conductor segments 24a and 24b extending respectively above the conductor segments 24b and 24a. This arrangement permits the conductor segments 24 to be connected electrically without allowing a large induced current to be created in gear 11 due to passage of current through connecting segment 25. In effect, these connecting segments 25 on the one hand are distanced from the gear tip 111s, thus greatly reducing the intensity of the currents induced by them in gear 11, and on the other hand they pass above a conductor segment 24, which thus acts as pumping short circuit for the currents induced by connecting segments 25. The current circulating in gear 11 is then mainly the current induced by the conductor segments 24, which are orthogonal to the generating line of gear 11, thus allowing homogeneous heating of the gear edge to be achieved.

Figure 3:
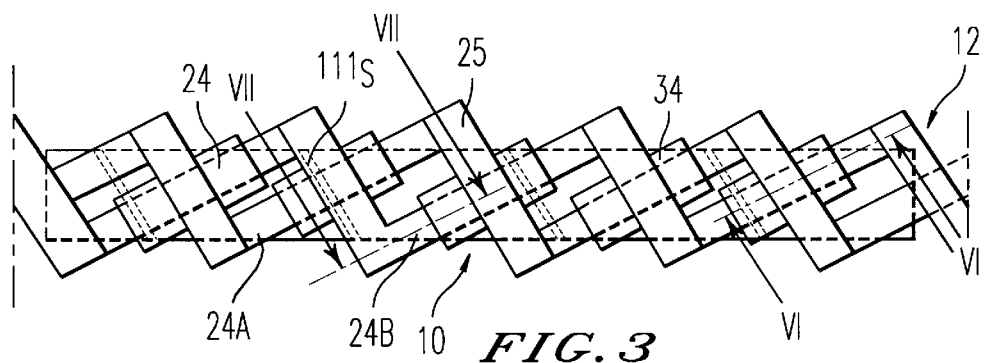
FIG. 3 is a developed view of a helical gear and of the induction coil of the first embodiment.

As shown in FIG. 3, the conductor segments 24 can extend through an element 34 for concentrating the induced magnetic field in such a way as to reinforce the heating of the median zone of gear 11. Such an element is comprised by materials 34 of high magnetic permeability which reinforce the currents induced by segments 24.

The first embodiment of the induction-heating device described hereinabove is advantageously applied to large-dimension gear mechanisms in which the width of gear 1 is small relative to the diameter D (D/I>4) and in which the helix angle of the gear is moderate (from 20° to 40°).

Figure 4A:
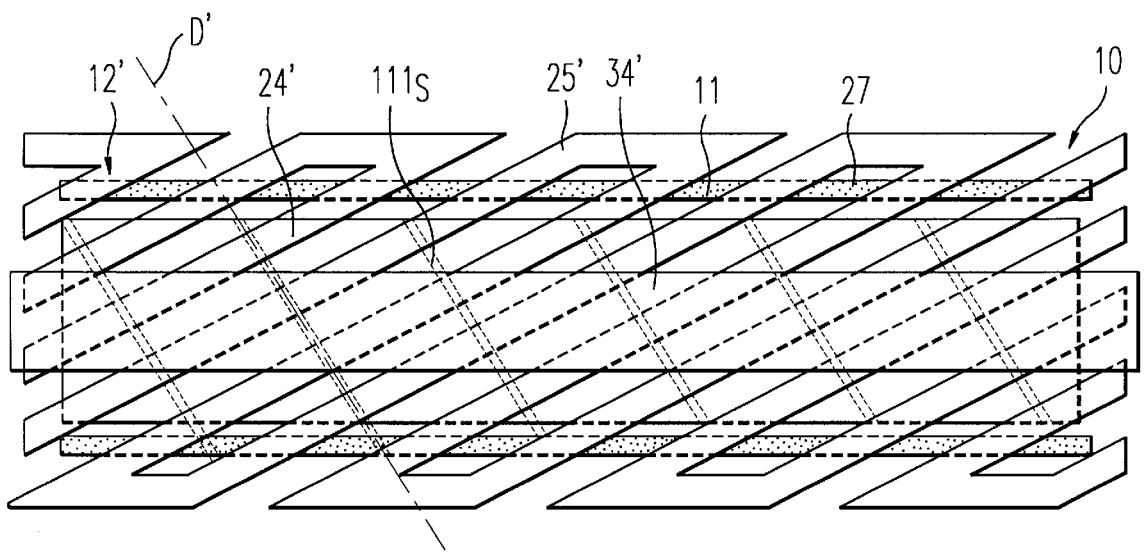
FIG. 4a is a developed view of a helical gear and of the induction coil illustrating a second embodiment of the induction-heating device according to the invention.
Figure 4B:
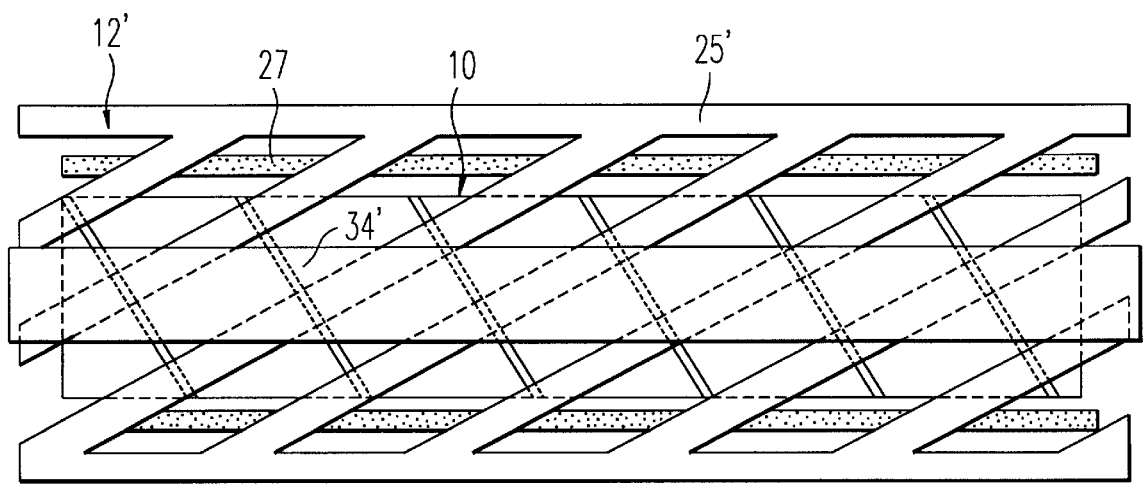
FIG. 4b is a developed view of a helical gear and of the induction coil illustrating a variant of the second embodiment of the induction-heating device according to the invention.
Figure 5A:
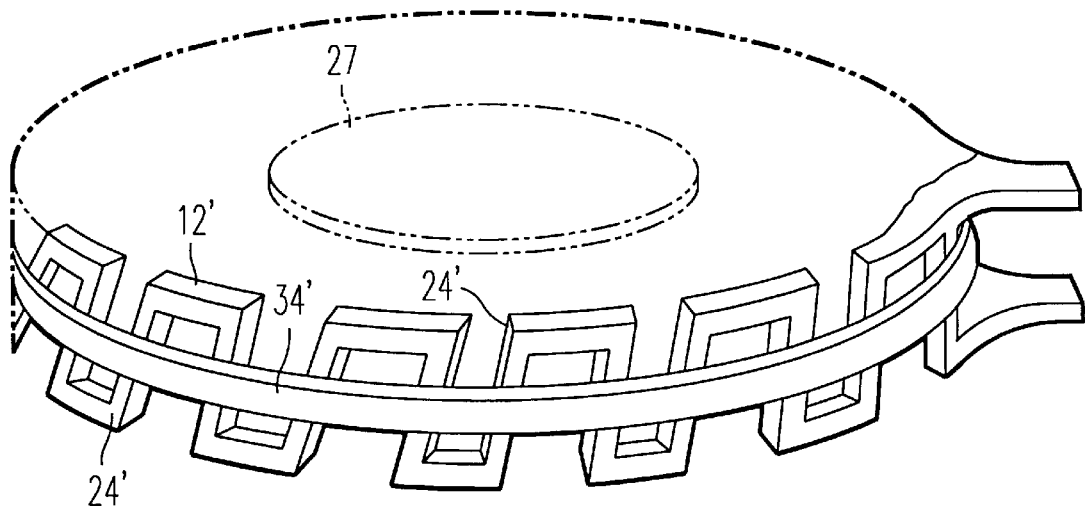
Figure 5B:
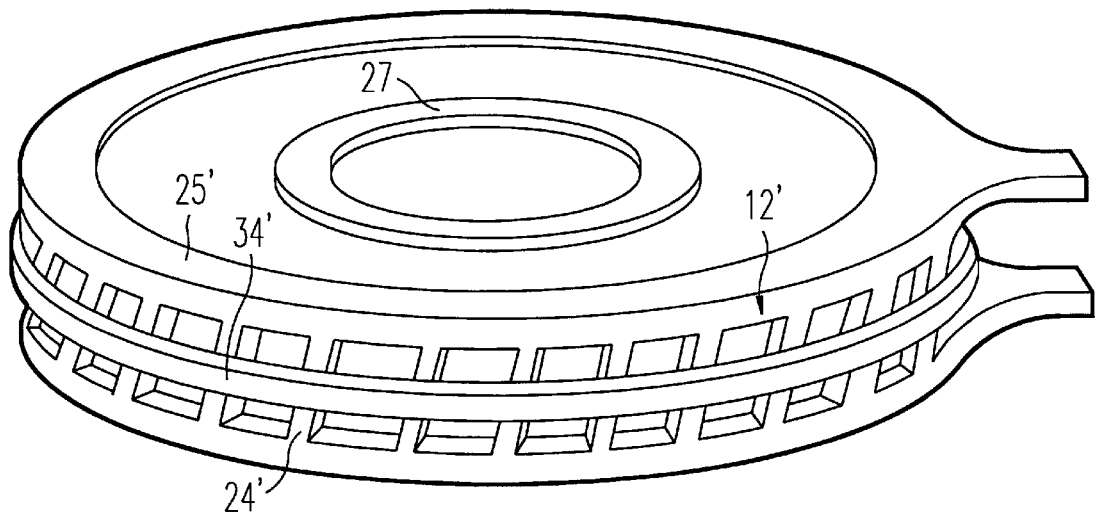
FIG. 5b is a perspective diagram of the induction coil shown in FIG. 4b.

FIGS. 4a and 5a correspond to a second embodiment of the induction-heating device according to the invention, characterized by high load impedance. FIGS. 4b and 5b correspond to a variant of the second embodiment, characterized by low load impedance. FIGS. 4a and 4b represent a developed view of pinion 10 and of its gear 11 surrounded by the induction coil 12'. Induction coil 12' is comprised by conductor segments 24' orthogonal to the generating line d' of the gear and interconnected by connecting segments 25'. These connecting segments 25' are distanced from the edges of gear 11 and disposed parallel to the edges of pinion 10. This arrangement permits the intensity of the currents induced in gear 11 by the current circulating in connecting segments 25' to be reduced considerably by increasing the distance between the connecting segments 25' and the edges of gear 11. The influence of these connecting segments 25' on the currents induced in the gear can be further reduced by adding short-circuit rings 27 disposed laterally at the gear side faces, thus permitting a reduction of the heating and therefore of the thickness of quenching at the teeth side face. This reduction of heating of the teeth side face can be desirable in the case of non-chamfered gears.

As shown in FIGS. 4a to 5b, the conductor segments 24' can extend through an element 34', comprised by materials of high magnetic permeability, for concentrating the induced magnetic field. In this case, the element 34' concentrates the magnetic field and the current induced in the median zone of the teeth, and prevents any overheating of the lateral edge of the gear.

This second embodiment of the induction-heating device is advantageously applicable to gear mechanisms of small dimension and gear with large width relative to the diameter D (D/I<5) and for large helix angles of the gear (>30°).

The induction-heating device according to the invention therefore permits an improvement in the symmetry of heating of the edges of gears of a pinion, and it can be advantageously applied to induction coils which are supplied successively by currents at two frequencies and which, because of their large heating powers, exacerbate the differences in circulation of induced currents, and application thereof permits the fatigue strength of gears to be substantially improved.

We claim:

1. An induction-heating device for surface treatment of a gear of a mechanical part on which each tooth has a projecting tip and a gear root for connection with an adjacent tooth, the generating line of the gear being non-parallel to the axis of rotation of the mechanical part, the device comprising an induction coil receiving the mechanical part concentrically therein with the coil being spaced from the tooth tips, wherein the coil is supplied by at least one high-frequency current source for preheating, and the coil comprises an assembly of conductor segments individually positionable orthogonal to the generating line of the gear when the mechanical part is concentrically received in the induction coil, the conductor segments being capable of being respectively located above the gear tips and being interconnected by connecting segments.

2. A device according to claim 1, characterized by the fact that the conductor segments extend through an element for concentrating the magnetic field induced by the said conductor segments.

3. A device according to claim 2, characterized by the fact that the element for concentrating the magnetic field extends above the median zone of the gear.

4. A device according to claim 3, characterized by the fact that the connecting segments extend above a first conductor segment and join together a second and a third conductor segment situated on both sides of the first conductor segment.

5. A device according to claim 3, characterized by the fact that the conductor segments extend beyond the side faces of the gear and are interconnected by connecting segments distanced from the said gear.

6. A device according to claim 2, characterized by the fact that the connecting segments extend above a first conductor segment and join together a second and a third conductor segment situated on both sides of the first conductor segment.

7. A device according to claim 2, characterized by the fact that the conductor segments extend beyond the side faces of the gear and are interconnected by connecting segments distanced from the said gear.

8. A device according to claim 1, characterized by the fact that the connecting segments extend above a first conductor segment and join together a second and a third conductor segment situated on both sides of the first conductor segment.

9. A device according to claim 1, characterized by the fact that the conductor segments extend beyond the side faces of the gear and are interconnected by connecting segments distanced from the said gear.

10. A device according to claim 9, characterized by the fact that short-circuit rings are disposed laterally and on both sides of the gears.

11. The induction heating device of claim 1, wherein the mechanical part is a steering rack.

12. The induction heating device of claim 1, wherein the mechanical part is a steering pinion.

* * * * *